United States Patent [19]

Rozman et al.

[11] Patent Number: 5,461,293
[45] Date of Patent: Oct. 24, 1995

[54] ROTOR POSITION DETECTOR

[75] Inventors: Gregory I. Rozman, Rockford; Albert L. Markunas, Roscoe; Leland E. Weber, Rockford, all of Ill.

[73] Assignee: Sundstrand Corporation, Rockford, Ill.

[21] Appl. No.: 60,878

[22] Filed: May 12, 1993

[51] Int. Cl.[6] .................................................. H02K 24/00
[52] U.S. Cl. ............................................. 318/603; 318/801
[58] Field of Search ............................... 318/602, 603, 318/605, 659–661, 778, 779, 798–803, 807–812

[56] References Cited

U.S. PATENT DOCUMENTS

| | | | |
|---|---|---|---|
| 3,775,974 | 12/1973 | Silver | 60/39.34 |
| 3,902,073 | 8/1975 | Lafuze | 290/46 |
| 3,908,161 | 9/1975 | Messenger | 322/29 |
| 4,093,869 | 6/1978 | Hoffman et al. | 290/31 |
| 4,171,522 | 10/1979 | Powell | 340/347 P |
| 4,295,085 | 10/1981 | Lafuze | 318/721 |
| 4,354,126 | 10/1982 | Yates | 310/156 |
| 4,456,830 | 6/1984 | Cronin | 290/27 |
| 4,473,752 | 9/1984 | Cronin | 290/38 R |
| 4,684,081 | 8/1987 | Cronin | 244/58 |
| 4,687,961 | 8/1987 | Horber | 310/186 |
| 4,694,210 | 9/1987 | Elliott et al. | 310/68 R |
| 4,708,030 | 11/1987 | Cordner | 74/686 |
| 4,743,777 | 5/1988 | Shilling et al. | 290/46 |
| 4,761,598 | 8/1988 | Lovrenich | 318/685 |
| 4,772,802 | 9/1988 | Glennon et al. | 290/31 |
| 4,777,422 | 10/1988 | Slicker et al. | 318/800 |
| 4,808,903 | 2/1989 | Matsui et al. | 318/800 |
| 4,825,132 | 4/1989 | Gritter | 318/811 |
| 4,841,216 | 6/1989 | Okada et al. | 322/10 |
| 4,868,406 | 9/1989 | Glennon et al. | 290/4 R |
| 4,868,479 | 9/1989 | Byong-Ho et al. | 318/721 |
| 4,870,338 | 9/1989 | Abbondanti | 318/809 |
| 4,885,518 | 12/1989 | Schauder | 318/798 |
| 4,893,066 | 1/1990 | Stewart et al. | 318/800 |
| 4,900,231 | 2/1990 | Kennedy | 417/16 |
| 4,933,623 | 6/1990 | Fox | 322/25 |
| 4,935,686 | 6/1990 | Stacey | 318/801 |
| 4,939,441 | 7/1990 | Dhyanchand | 318/718 |
| 4,942,493 | 7/1990 | Rozman et al. | 361/23 |
| 4,943,760 | 7/1990 | Byrne et al. | 318/701 |
| 4,947,100 | 8/1990 | Dhyanchand et al. | 322/10 |
| 4,949,021 | 8/1990 | Rozman et al. | 318/254 |
| 4,959,595 | 9/1990 | Nishimura | 318/138 |
| 4,967,334 | 10/1990 | Cook et al. | 363/34 |
| 4,968,926 | 11/1990 | Dhyanchand | 322/10 |
| 4,988,939 | 1/1991 | Reichard et al. | 318/800 |
| 4,992,721 | 2/1991 | Latos | 322/10 |
| 5,008,801 | 4/1991 | Glennon | 363/132 |
| 5,012,177 | 4/1991 | Dhyanchand et al. | 322/10 |
| 5,013,929 | 5/1991 | Dhyanchand | 290/31 |
| 5,015,927 | 5/1991 | Reichard | 318/139 |
| 5,015,941 | 5/1991 | Dhyanchand | 322/10 |
| 5,028,803 | 7/1991 | Reynolds | 290/31 |

(List continued on next page.)

FOREIGN PATENT DOCUMENTS 2206751  1/1989  United Kingdom.

OTHER PUBLICATIONS

E. Iizuka, et al., *IEEE Transactions on Industry Applications*, vol. 1A-21, No. 4, May/Jun. 1985.

Furuhashi, et al., *IEEE Transactions on Industrial Electronics*, vol. 39, No. 2. Apr. 1992.

Primary Examiner—William M. Shoop, Jr.
Assistant Examiner—Brian Sircus
Attorney, Agent, or Firm—Jeffery J. Makeever

[57] ABSTRACT

A detector for detecting rotor position of a brushless generator includes a shaft pulse encoder which develops a cycle pulse once per revolution of a motive power shaft and a circuit coupled to armature phase windings of a permanent magnet generator of the brushless generator for deriving a number of interval pulses per revolution of the motive power shaft. A circuit measures time periods between adjacent interval pulses and the measured time periods are converted into an indication of the angular position of the motive power shaft.

12 Claims, 6 Drawing Sheets

U.S. PATENT DOCUMENTS

| | | | |
|---|---|---|---|
| 5,040,366 | 8/1991 | Schulze | 60/39.08 |
| 5,051,670 | 9/1991 | De Piola | 318/434 |
| 5,055,700 | 10/1991 | Dhyanchand | 290/31 |
| 5,055,764 | 10/1991 | Rozman et al. | 322/10 |
| 5,068,590 | 11/1991 | Glennon et al. | 322/10 |
| 5,079,494 | 1/1992 | Reichard | 318/811 |
| 5,097,195 | 3/1992 | Raad et al. | 322/10 |
| 5,113,125 | 5/1992 | Stacey | 318/721 |
| 5,132,604 | 7/1992 | Shimane et al. | 322/10 |
| 5,140,245 | 8/1992 | Stacey | 318/723 |
| 5,166,593 | 11/1992 | De Doncker et al. | 318/800 |
| 5,189,353 | 2/1993 | Ezuka | 318/805 |
| 5,298,847 | 3/1994 | Kerkman et al. | 318/800 |

FIG.1A
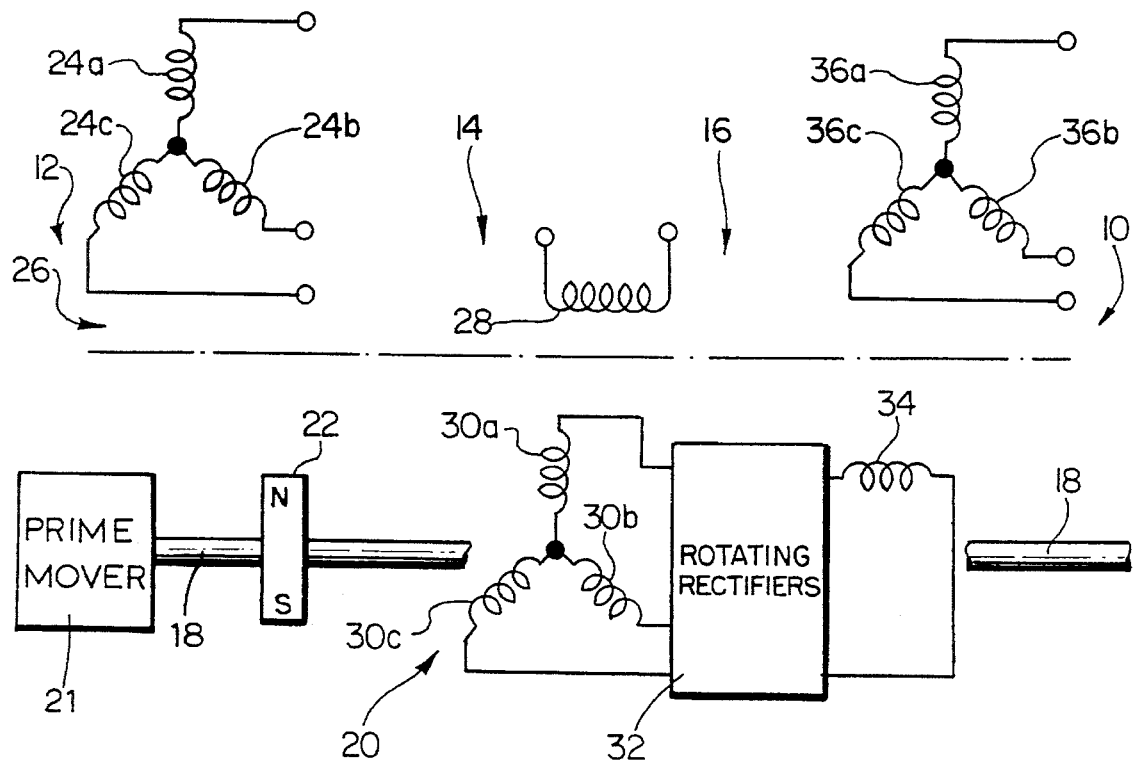
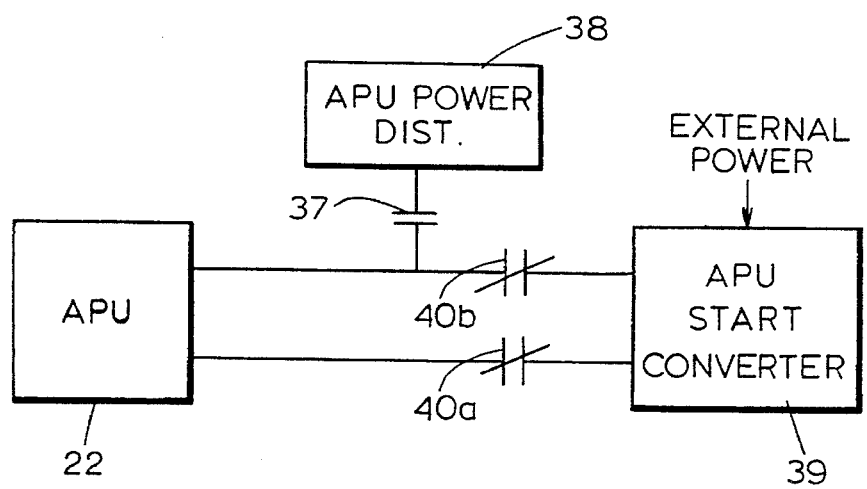
FIG.1B

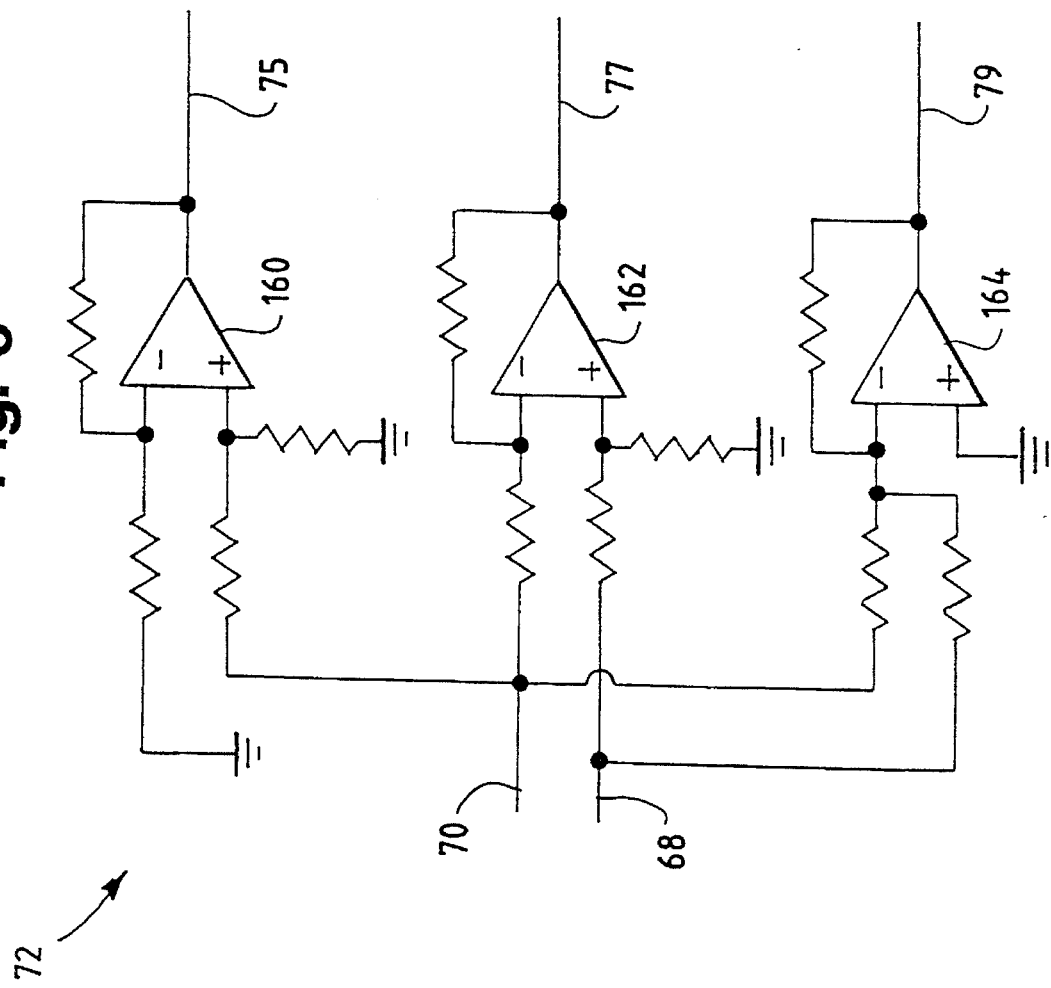

ROTOR POSITION DETECTOR

TECHNICAL FIELD

The present invention relates generally to electromagnetic machines, and more particularly to a detector for detecting the rotor position of a brushless generator and a control system incorporating such a detector.

BACKGROUND ART

An auxiliary power unit (APU) system is often provided on an aircraft and is operable to provide auxiliary and/or emergency power to one or more aircraft loads. In conventional APU systems, a dedicated starter motor is operated during a starting sequence to bring a gas turbine engine up to self-sustaining speed, following which the engine is accelerated to operating speed. Once this condition is reached, a brushless, synchronous generator is coupled to and driven by the gas turbine engine during operation in a starting mode whereupon the generator develops electrical power.

As is known, an electromagnetic machine may be operated as a motor to convert electrical power into motive power. Thus, in those applications where a source of motive power is required for engine starting, such as in an APU system, it is possible to dispense with the need for the dedicated starter motor and operate the generator as a motor during the starting sequence to accelerate the engine to self-sustaining speed. This capability is particularly advantageous in aircraft applications where size and weight must be held to a minimum.

The use of a generator in starting and generating modes in an aircraft application has been realized in a variable-speed, constant-frequency (VSCF) power generating system. In such a system a brushless, three-phase synchronous generator operates in the generating mode to convert variable-speed motive power supplied by a prime mover into variable-frequency AC power. The variable-frequency power is rectified and provided over a DC link to a controllable static inverter. The inverter is operated to produce constant-frequency AC power, which is then supplied over a load bus to one or more loads.

The generator of such a VSCF system is operated as a motor in the starting mode to convert electrical power supplied by an external AC power source into motive power which is provided to the prime mover to bring it up to self-sustaining speed. In the case of a brushless, synchronous generator including a permanent magnet generator (PMG), an exciter portion and a main generator portion mounted on a common shaft, it has been known to provide power at a controlled voltage and frequency to the armature windings of the main generator portion and to provide field current to the main generator portion field windings via the exciter portion so that the motive power may be developed. This has been accomplished in the past, for example, using two separate inverters, one to provide power to the main generator portion armature windings and the other to provide power to the exciter portion. Thereafter, operation in the generating mode may commence whereupon DC power is provided to the exciter field winding.

In order to properly accelerate the generator and prime mover during operation in the starting mode, it is necessary to properly commutate or switch the currents among the armature windings of the generator. In the past, proper commutation was achieved using an absolute position sensor, such as a resolver, a synchro, an optical encoder or hall effect devices. For example, in Lafuze, U.S. Pat. No. 3,902,073 three Hall sensors are mounted in an air gap of a PMG 120 electrical degrees apart with respect to permanent magnet rotor pole pairs. As the rotor of the PMG rotates, the voltage output of each Hall sensor switches on and off as a function of the rotor position thereby generating three square wave voltages spaced apart by 120 electrical degrees. The outputs from the Hall sensors are representative of the position of the PMG rotor. The output signals from the Hall sensors are used to control switching elements in cycloconverters to switch current to armature windings of a main generator portion.

Use of an external absolute position sensor entails considerable expense in the position sensor itself and associated electronics, and further results in extra wires and the need for an extra assembly step to install the components. Also, operational parameters often limit the accuracy of the sensor.

In view of the foregoing difficulties, other approaches have been taken in an effort to detect rotor position without the need for absolute position sensors. In the case of a brushless DC motor control, a back EMF approach has been used to detect rotor position. The back EMF of the motor is defined by the following equation:

$$E_{emf} = K\omega \sin\alpha$$

where K is a constant, $\omega$ is the angular speed of the motor and $\alpha$ is the electrical phase angle of the rotor. From the foregoing equation, it can be seen that if back EMF can be detected, rotor electrical phase angle can be determined and thus proper commutation of the armature windings of the motor can be achieved. The back EMF voltage can be detected using either of two methods, referred to as the direct method and the indirect method.

The direct method can be used to directly measure phase back EMF voltage only when the phase winding is not energized by the inverter connected thereto and when the winding is not short circuited either by closed switches in the inverter or by conducting flyback diodes in the inverter. Such conditions can be realized when a 120 degree commutation algorithm is utilized. In this case, a voltage reading is taken after a short delay following switching of the phase winding off to ensure complete current decay by the freewilling diodes. This direct technique is described in a paper entitled "Microcomputer Control for Sensorless Brushless Motor" by E. Iizuka et al., *IEEE Transactions on Industry Application*, Vol. IA-21, No. 4, May/June 1985.

The indirect method is based on estimating the back EMF from the motive terminal voltage and phase currents. This method is suitable for both 120 and 180 degree commutation algorithms. One technique that uses this method is described in a paper entitled "Position-and-Velocity Sensorless Control for Brushless DC Motor Using an Adaptive Sliding Mode Observer" by Furuhashi et al., *IEEE Transactions on Industrial Electronics*, Vol. 39, No. 2, April 1992.

Because the back EMF voltage of a motor is zero at standstill and the signal to noise ratio is small at lower speeds, the reliable determination of rotor position by detecting back EMF is limited at low rotor speeds.

A method of using a permanent magnet generator as a position sensor for motor/generator start is described in Stacey U.S. Pat. No. 5,140,245. A standard brushless generator is equipped with a PMG which is used as an emergency electric power source and as a source of control power during a normal or generating mode of operation. The PMG develops a multi-phase output which is supplied to a high resolution phase-locked loop having a binary counter which develops an output signal representing shaft position. This method, however, is limited to the situation where the number of PMG rotor poles is equal to or less than the number of poles on the main generator portion rotor so that ambiguous position readings are avoided.

SUMMARY OF THE INVENTION

In accordance with the present invention, a detector for detecting rotor position of brushless generator utilizes inexpensive components and operates in a simple and effective manner.

More particularly, a detector for detecting rotor position of a brushless generator having a motive power shaft, a permanent magnet generator (PMG) having a set of armature phase windings at which a set of PMG phase outputs are produced and a main generator portion having a set of armature phase windings includes a shaft pulse encoder which develops a cycle pulse once per revolution of the motive power shaft. Means are coupled to the PMG armature phase windings for deriving a number of interval pulses per revolution of the motive power shaft from the PMG phase outputs and means are coupled to the developing means for measuring time periods between adjacent interval pulses. Means are coupled to the measuring means and responsive to the cycle pulse for converting the measured time periods into an indication of the angular position of the motive power shaft.

Preferably, the measuring means comprises a counter which accumulates clock pulses during time periods between adjacent interval pulses. Also preferably, the counter is periodically reset a certain number of times during each revolution of the motive power shaft by the interval pulses.

Still further in accordance with the preferred embodiment, the converting means includes means for inverting a counter output signal developed by the counter to obtain an indication of the speed of the motive power shaft. The converting means also preferably includes an integrator coupled to the inverting means which develops the angular position indication. The integrator is preferably reset once per revolution of the motive power shaft by a reset signal.

In accordance with a further aspect of the present invention, a starting system control for operating a brushless generator in a starting mode to convert electrical power into motive power wherein the brushless generator includes a motive power shaft, a PMG having a set of armature phase windings at which a set PMG phase outputs are produced and a main generator portion having a set of armature phase windings includes a shaft pulse encoder disposed on the motive power shaft which develops a cycle pulse once per revolution of the motive power shaft. Means are coupled to the PMG armature phase windings for deriving a number of interval pulses per revolution of the motive power shaft from the PMG phase outputs. Means are coupled to the developing means for converting the measured time periods between adjacent interval pulses and means are coupled to the measuring means for converting the measured time periods into indications of the speed and angular position of the motive power shaft. Means are coupled to the converting means for delivering AC power to the set of main generator portion armature windings in dependence upon the speed and angular position indications.

In accordance with yet another aspect of the present invention, a method of detecting rotor position of a brushless generator having a motive power shaft, a PMG having a set of armature phase windings at which a set of PMG phase outputs are produced and a main generator portion coupled to the exciter portion includes the steps of providing a shaft pulse encoder which develops a cycle pulse once per revolution of the motive power shaft and deriving a number of interval pulses per revolution of the motive power shaft from the PMG phase outputs. The time periods between adjacent pulses are measured and the measured time periods are converted into an indication of the angular position of the motive power shaft.

The detector of the present invention does not require the use of a high resolution absolute position sensor, nor is it limited to use with any particular commutation algorithm nor is there any constraint on the number of PMG rotor poles relative to the number of main generator portion rotor poles.

BRIEF DESCRIPTION OF THE DRAWINGS

FIG. 1A comprises a combined block and schematic diagram of a brushless, synchronous generator;

FIG. 1B comprises a block diagram of an APU system together with a start converter;

FIG. 6 comprises a circuit diagram of the phase converter of FIG. 2.

DESCRIPTION OF THE PREFERRED EMBODIMENT

Figure 2:
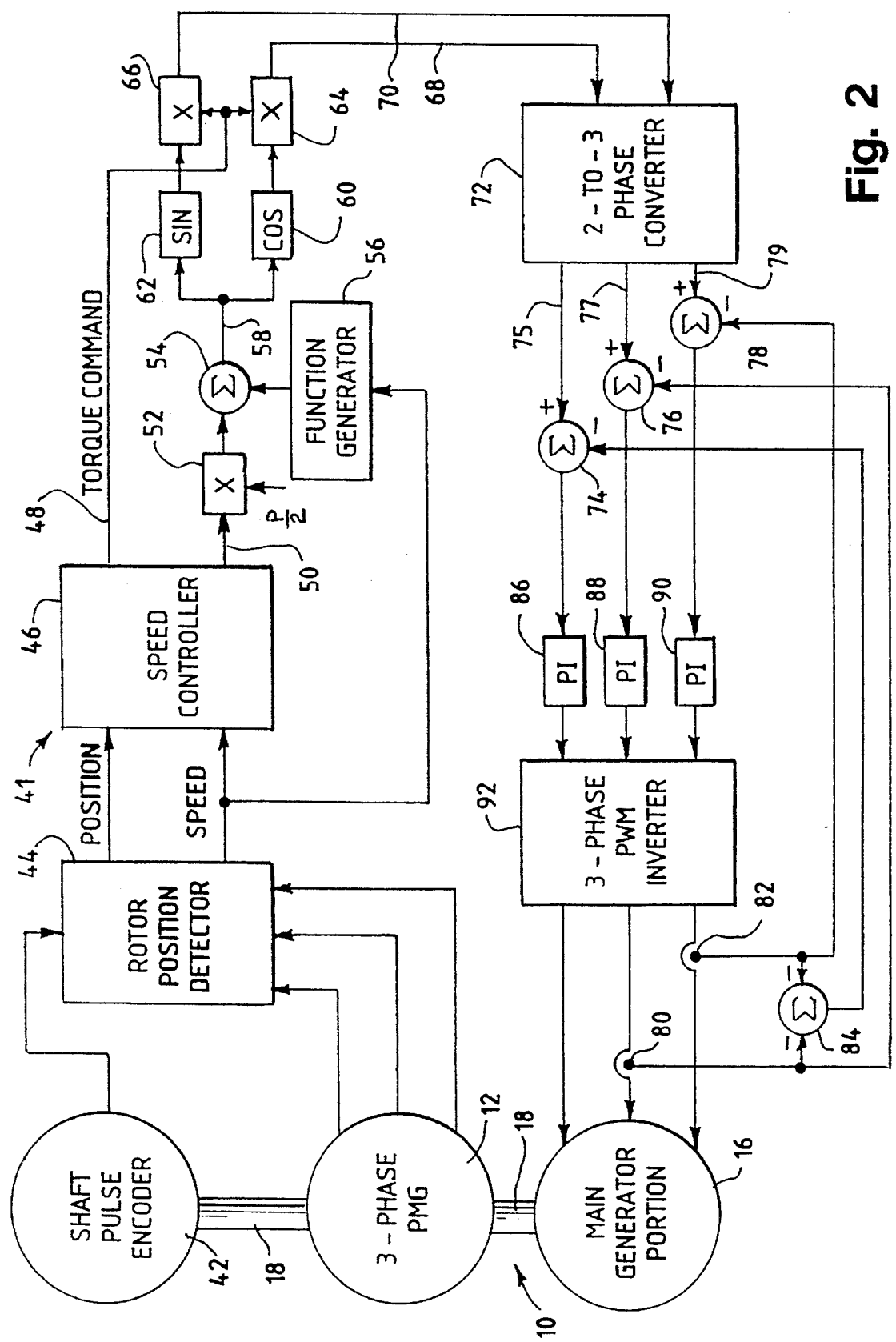
FIG. 2 comprises a block diagram illustrating a rotor position detector and a starting system control according to the present invention.

Referring now to FIG. 1A, a brushless, synchronous generator 10 includes a permanent magnet generator (PMG) 12, an exciter portion 14 and a main generator portion 16. The generator 10 further includes a motive power shaft 18 interconnecting a rotor 20 of the generator 10 and a prime mover 21, such as a gas turbine engine. In a specific application of the present invention, the generator 10 and the prime mover 21 together may comprise an aircraft auxiliary power unit (APU) 22, although the present invention is equally useful in other prime mover/generator applications.

The rotor 20 carries one or more permanent magnets 23 which form poles for the PMG 12. Rotation of the motive power shaft 18 causes relative movement between the magnetic flux produced by the permanent magnet 23 and a set of three-phase PMG armature windings including phase windings 24a–24c mounted within a stator 26 of the generator 10.

The exciter portion 14 includes a field winding 28 disposed in the stator 26 and a set of three-phase armature windings 30a–30c disposed on the rotor 20. A set of rotating rectifiers 32 interconnect the exciter armature windings 30a–30c and a main generator portion field winding 34 also disposed on the rotor 20. Three-phase main generator portion armature windings 36a–36c are disposed in the stator 26.

During operation in a generating mode, at least one, and preferably all three of the PMG armature windings 24a–24c are coupled through a rectifier and voltage regulator (not shown) to the exciter portion field winding 28. As the motive power shaft 18 is rotated, power produced in the PMG armature windings 24a–24c is rectified, regulated and delivered to the field winding 28. AC power is produced. in the armature windings 30a–30c, rectified by the rotating rectifiers 32 and applied to the main generator portion field winding 34. Rotation of the motive power shaft 18 and the field winding 34 induces three-phase AC voltages in the main generator portion armature windings 36a–36c as is conventional. As seen in FIG. 1B, the AC voltages are supplied through a contactor set 37 to an APU power distribution network 38 and thence to one or more loads (not shown).

Often, it is desirable to use the brushless generator 10 as a motor to bring the prime mover 21 up to self-sustaining speed. This operation is accomplished by providing electrical power to the main generator portion field winding 34 via the exciter 14, providing AC power to the main generator portion armature windings 36a–36c and suitably commutating the currents flowing in the windings 36a–36c to cause the motive power shaft 18 to rotate. In a specific embodiment, the electrical power for the generator 10 is developed by an APU start converter 39, FIG. 1B, which receives external electrical power and which is connected by contactor sets 40a, 40b to the exciter field winding 28 and the armature windings 36a–36c, respectively. Various methods have been devised for controlling the power supplied to the main generator field winding 34 via the exciter 14. Inasmuch as the method of exciter control forms no part of the present invention, it will not be described in detail herein.

FIG. 2 illustrates the PMG 12, the main generator portion 16 and the motive power shaft 18 of the generator 10 together with a starting system 41 for providing electrical power to the armature windings 36a–36c during operation of the generator 10 in the starting mode to convert electrical power into motive power. While not shown, power may also be provided to the exciter field winding 28, and thus to the exciter armature windings 30a–30c and thus to the main generator portion field windings 34 by any suitable means during operation in the starting mode. The application of power to the exciter field winding 28 forms no part of the present invention and will not be described in detail herein.

The starting system 41 includes a shaft pulse encoder 42 which is mounted on the motive power shaft 18 and which develops a cycle pulse once per revolution of the motive power shaft 18. The shaft pulse encoder 42 may comprise a magnetic pick-up which senses a lobe or other projection of magnetic material mounted on the motive power shaft 18. Alternatively, any other component capable of producing the cycle pulse may be used. Advantageously, the shaft pulse encoder may be simple in design and inexpensive. The phase outputs developed by the PMG 12 and the output of the shaft pulse encoder 42 are supplied to a rotor position detector 44 which develops signals representing the position and speed of the motive power shaft 18 and delivers such signals to a speed controller 46. The speed controller 46 develops a torque command signal on a line 48 representing the commanded torque to be produced by the generator 10 and a further signal on a line 50 representing the mechanical position of the motive power shaft 18. The signal on the line 50 is multiplied by a multiplier 52 with a signal representing the number of pairs of poles of the main generator rotor, and the resulting signal is summed with a phase advance signal by a summer 54. The phase advance signal is developed by a function generator 56 and is dependent upon the speed of the motive power shaft as detected by the rotor position detector 44. The function generator 56 provides increasing phase advance as speed increases in a high speed range. The summer 54 develops an electrical angle command signal on a line 58 which is supplied to first and second functional blocks 60, 62 which generate a cosine waveform signal and a sine waveform signal, respectively, each of which has the same frequency as the electrical angle command signal on the line 58.

Second and third multipliers 64, 66 are coupled to the blocks 60, 62, respectively, and multiply the outputs thereof with the torque command signal on the line 48. The output signals generated by the multipliers 64, 66 are provided to a 2-to-3 phase converter 72 via a pair of lines 68 and 70. The phase converter 72 converts those signals into three-phase sinusoidal current signals which are in turn supplied to three summers 74, 76, and 78 via lines 75, 77, and 79, respectively. Each of the summers 74, 76, and 78 sums one of the three-phase current signals produced by the phase converter 72 with a signal representing the magnitude of a phase current of the AC power to obtain an error signal. In the case of the summers 76 and 78, the phase current magnitudes are detected by current sensors 80, 82 while the phase current magnitude for the summer 74 is obtained by a summer 84 which adds (in a negative sense) the magnitudes developed by the current sensors 80, 82. The error signals are processed by gain and compensation units 86, 88, and 90, preferably of the proportional-integral type, and are supplied to a three-phase, pulse-width modulated (PWM) inverter 92. The inverter 92 is operated in a current mode of operation according to known techniques to deliver AC power to the set of main generator portion armature windings 36a–36c in dependence upon the speed and angular position signals developed by the rotor position detector 44.

Figure 3:
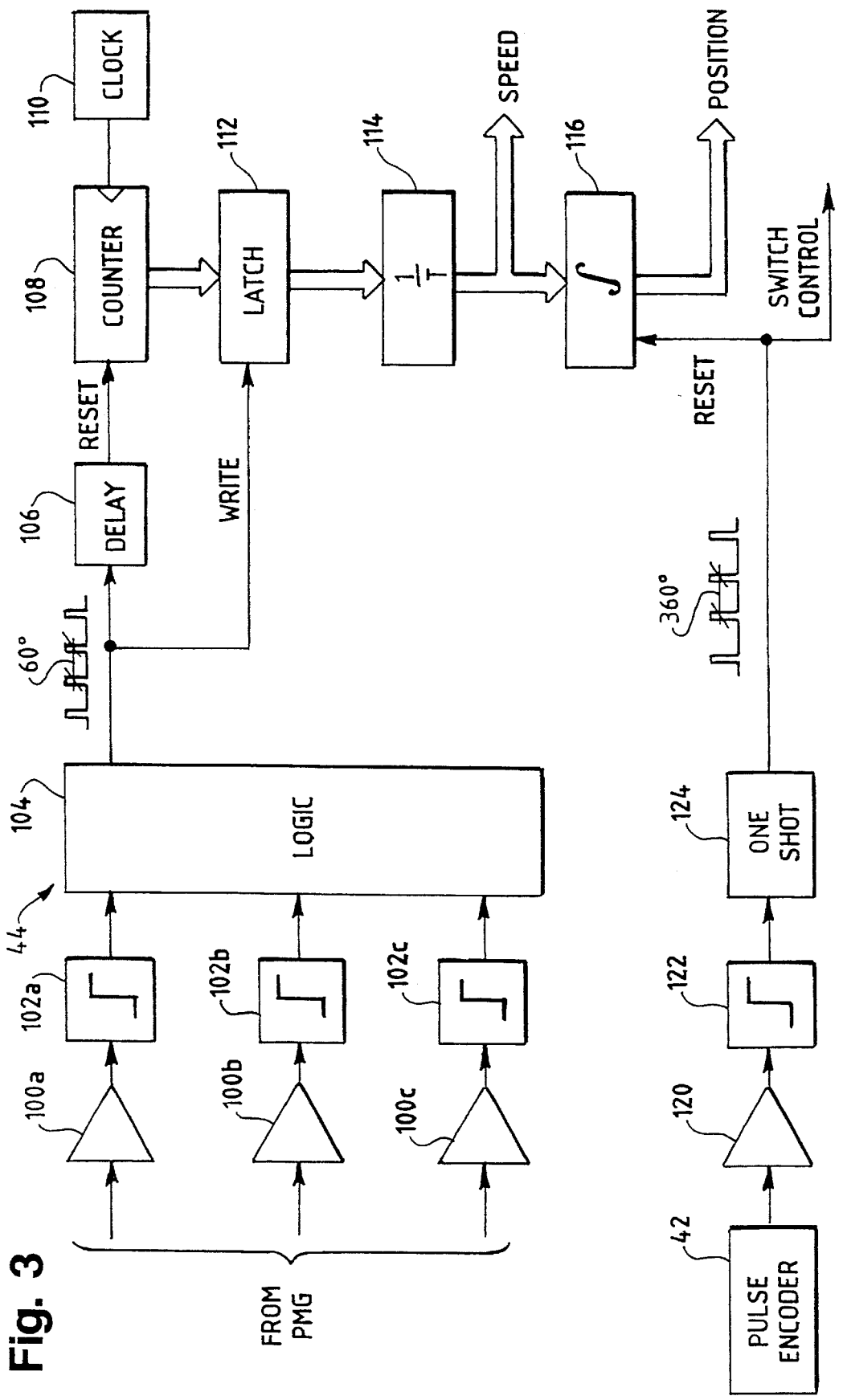
FIG. 3 comprises a block diagram of the rotor position detector of FIG. 2.
Figure 4:
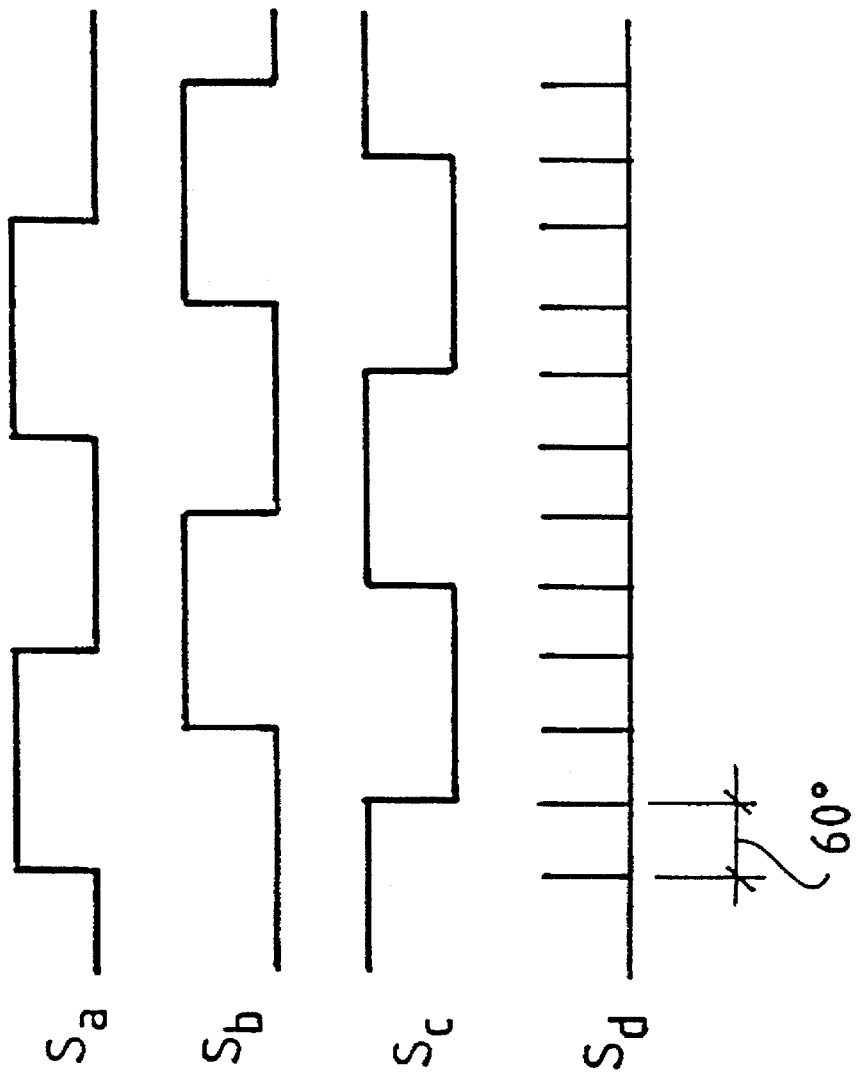
FIG. 4 illustrates the inputs to and the output from the logic circuit of FIG. 3.

Referring now to FIG. 3, the rotor position detector 44 is shown in greater detail. The PMG phase outputs are supplied through interface amplifiers 100a–100c and zero crossing detectors 102a–102c to a logic circuit 104. FIG. 4 illustrates three waveforms $S_a$, $S_b$, and $S_c$ representing the outputs of the zero crossing detectors 102a–102c, respectively. From the waveforms $S_a$–$S_c$, the logic circuit 104 develops a signal $S_d$ which, as shown in FIG. 4, consists of a narrow pulse every 60 electrical degrees. The waveform $S_d$ is provided by the logic circuit 104 to a delay circuit 106. The delay circuit 106 provides a reset signal to a counter 108 which accumulates clock pulses produced by a clock 110. The counter 108 is reset every 60° with respect to the output waveforms of the PMG 12, and thus every 60° of rotation of the motive power shaft 18. The output of the counter 108 represents the time that elapses between each pulse in the waveform $S_d$. The falling edge of each pulse comprises a write command to a latch 112 which latches the output of the counter 108. The output of the latch 112 is inverted, i.e., the reciprocal thereof is calculated, by a circuit 114 to obtain an indication of the speed of the motive power shaft 18. The output of the circuit 114 is supplied to an integrator 116 which integrates the speed signal to generate a signal representative of the position of the motive power shaft 18. The integrator 116 is reset once per full revolution of the motive power shaft 18 by the shaft pulse encoder 42, an interface amplifier 120, a zero crossing detector 122 and a one-shot 124.

Alternatively, instead of the reset signal provided to the integrator 116 being generated from a pulse developed by the shaft pulse encoder 42, the reset signal could be generated from a pulse generated by a sensing coil mounted on the stator of the permanent magnet generator 12.

Figure 5:
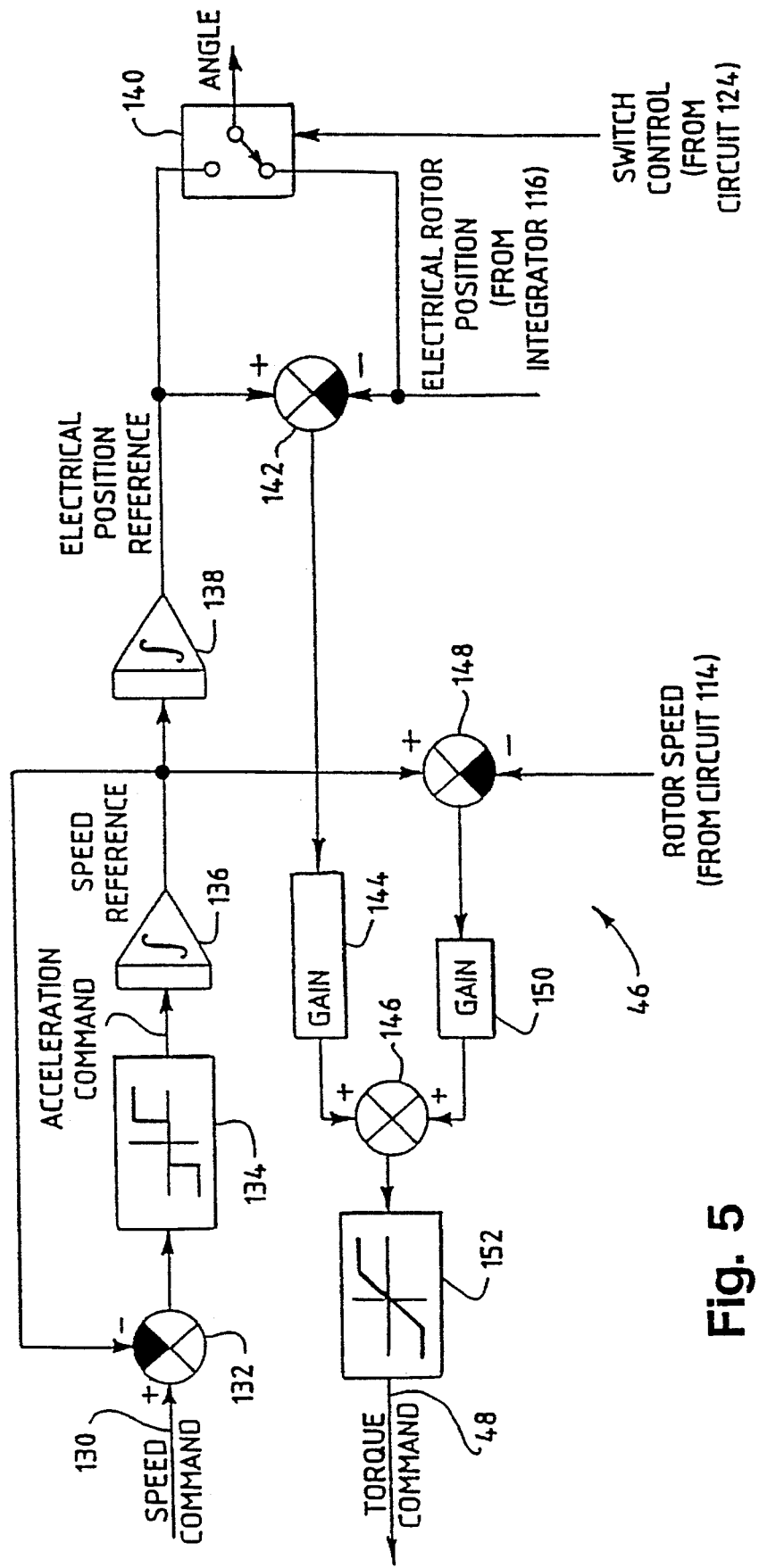
FIG. 5 comprises a block diagram of the speed controller of FIG. 2.

FIG. 5 illustrates the speed controller 46 in greater detail. A speed command signal may be developed on a line 130 which is in turn coupled to a non-inverting of a summer 132.

The speed command may comprise a step voltage from a first voltage to a second, higher voltage or may comprise any other type of waveform as desired. The output of the summer 132 is coupled to a function generator 134 which develops an acceleration command signal which is in turn integrated by an integrator 136 to produce a speed reference signal. The speed reference signal is fed back to an inverting input of the summer 132, and hence the elements 132, 134, and 136 comprise a closed-loop circuit. The speed reference signal is integrated by a further integrator 138 to develop a position reference signal which is in turn provided to a controllable switch 140 and a non-inverting input of a summer 142. The position signal from the integrator 116 is also provided to the controllable switch 140 and is further provided to an inverting input of the summer 142. At the initiation of a start-up sequence, at which time the speed of the motive power shaft 18 is zero, the switch 140 is set to a position which passes the output of the integrator 138 to the output of the switch 140, and thus to the multiplier 52 of FIG. 2. Also at this time, power is applied to the exciter portion 14, and hence to the main generation portion field winding 34, FIG. 1A, and power is also applied to the main generator armature windings 36a–36c. The motive power shaft 18 is thus accelerated and, once a particular point is reached, for example at the end of a full revolution of the motive power shaft 18 as detected by the encoder 42 and the elements 120–124, the controllable switch 140 is moved to the position shown in FIG. 5 and latched in such position so that the output of the integrator 116 of FIG. 3 is thereafter provided through the multiplier 52 of FIG. 2. The controllable switch 140 is latched in this state until a new command for a start-up sequence is initiated.

The output of the summer 142 comprises an error signal which represents the deviation of the actual rotor position from the rotor position reference signal developed by the integrator 138. This error signal is conditioned by a gain unit 144 and is supplied to a first input of a summer 146. A speed error signal is developed by a summer 148 which subtracts the rotor speed signal developed by the circuit 114 of FIG. 3 from the speed reference signal developed by the integrator 136. The speed error signal is processed by a gain unit 150 and is summed with the output of the gain unit 144 by the summer 146. A limiter 152 provides limiting for the output of the summer 146 and develops a current limited torque command signal which is developed on the line 48.

FIG. 6 illustrates in greater detail the phase converter 72 shown schematically in FIG. 2. The converter 72 includes three operational amplifiers 160, 162, 164 and associated biasing circuitry connected to the lines 68, 70 which generate outputs on the lines 75, 77, 79.

As should be evident from the foregoing discussion, PMG 12 operates as an incremental encoder, while shaft pulse encoder 42 provides an absolute rotor position indication.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. A starting system control for operating a brushless generator in a starting mode to convert electrical power into motive power wherein the brushless generator includes a motive power shaft, a permanent magnet generator (PMG) having a set of armature phase windings at which a set of PMG phase outputs are produced and a main generator portion having a set of armature phase windings, comprising:

a shaft pulse encoder disposed on the motive power shaft which develops a cycle pulse once per revolution of the motive power shaft;

means coupled to the PMG armature phase windings for deriving a number of interval pulses per revolution of the motive power shaft from the PMG phase outputs;

means coupled to the deriving means for measuring time periods between adjacent interval pulses;

means coupled to the measuring means and responsive to the cycle pulse for converting the measured time periods into indications of the speed and angular position of the motive power shaft; and means coupled to the converting means for delivering AC power to the set of main generator portion armature windings in dependence upon the speed and angular position indications wherein the delivering means comprises:

second developing means for developing a torque command signal and an electrical angle command signal from the speed and angular position indications; and an inverter responsive to the torque command signal and the electrical angle command signal which develops the AC power.

2. The starting system control of claim 1, wherein the inverter is operated in a current mode of operation.

3. The starting system control of claim 1, further including a second converting means for converting the electrical angle command signal into a sine signal and a cosine signal, first and second multipliers coupled to the second converting means for multiplying the sine and cosine signals with the torque command signal to obtain a pair of current signals and third converting means for converting the pair of current signals into three-phase signals.

4. The starting system control of claim 3, further including three summers each of which sums one of the three-phase signals with a signal representing a magnitude of a phase current of the AC power to obtain an error signal and an inverter control coupled between the summers and the inverter which operates the inverter in accordance with the error signals.

5. The starting system control of claim 1, wherein the main generator portion includes a number of poles and the angular position indication comprises a position signal and wherein the second developing means includes a multiplier which multiplies the position signal with a signal proportional to the number of poles to obtain a multiplied signal and a summer for summing the multiplied signal with a phase advance command to obtain the electrical angle command signal.

6. The starting system control of claim 1, wherein the motive power shaft is accelerated from zero speed to a particular speed over a series of revolutions, the main generator portion includes a number of poles and the angular position indication comprises a position signal and wherein the second developing means includes a position reference signal generator which develops a position reference signal, a switch which provides the position reference signal to an output thereof during an initial portion of the series of revolutions and which provides the position signal to the output after the initial portion of the series of revolutions, a multiplier coupled to the switch which multiplies the signal at the output of the switch with a signal proportional to the number of poles to obtain a multiplied signal and a summer for summing the multiplied signal with a phase advance command to obtain the electrical angle command signal.

7. The starting system control of claim 6, wherein the second developing means further includes third developing means responsive to a speed command signal and the speed indication for developing a speed error signal, fourth developing means responsive to the position reference signal and the angular position indication for developing a position error signal and a further summer for summing the speed error signal and the position error signal.

8. The starting system control of claim 7, wherein the second developing means further includes a limiter coupled to the further summer which develops the torque command signal.

9. The starting system control of claim 1, wherein the measuring means comprises a counter which accumulates clock pulses during time periods between adjacent interval pulses.

10. The starting system control of claim 9, wherein the converting means includes means for inverting a counter output signal developed by the counter to obtain the speed indication.

11. The starting system control of claim 10, wherein the converting means further includes an integrator coupled to the inverting means which develops the angular position indication.

12. The starting system control of claim 11, wherein the integrator is periodically reset once per revolution of the motive power shaft by a reset signal derived from the cycle pulses.

* * * * *